(12) United States Patent
Evans et al.

(10) Patent No.: US 10,742,739 B2
(45) Date of Patent: Aug. 11, 2020

(54) PLATFORM FOR CONTROLLING AND OPERATING NETWORK CONNECTED DEVICES

(71) Applicant: Comcast Cable Communications, LLC, Philadelphia, PA (US)

(72) Inventors: David Kenneth Evans, Los Altos Hills, CA (US); Michael Alexander Yurochko, Los Gatos, CA (US); Yaron Sheba, Mountain View, CA (US); Kristopher Charles Linquist, Milpitas, CA (US); Hitesh Kalra, Cupertino, CA (US); David Frank Russell Weir, San Jose, CA (US); Rajiv Ramanasankaran, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 163 days.

(21) Appl. No.: 15/015,022

(22) Filed: Feb. 3, 2016

(65) Prior Publication Data

US 2017/0054810 A1      Feb. 23, 2017

Related U.S. Application Data

(60) Provisional application No. 62/206,467, filed on Aug. 18, 2015.

(51) Int. Cl.
*H04L 29/08* (2006.01)
*H04L 12/24* (2006.01)

(52) U.S. Cl.
CPC .......... *H04L 67/12* (2013.01); *H04L 41/0816* (2013.01); *H04L 41/0893* (2013.01); *H04L 41/145* (2013.01); *H04L 41/28* (2013.01)

(58) Field of Classification Search
CPC ... H04L 67/12; H04L 41/0816; H04L 41/145; H04W 4/003–005
See application file for complete search history.

(56) References Cited

U.S. PATENT DOCUMENTS 7,133,907 B2      11/2006    Carlson et al.
9,210,534 B1 *    12/2015    Matthieu ............... H04W 4/005
(Continued)

OTHER PUBLICATIONS

Mios, Main Page, Last modified Apr. 23, 2015, 2 Pages, [online] [retrieved on Jan. 12, 2017] Retrieved from the internet <URL:http://wiki.mios.com/index.php/MainPage>.
(Continued)

*Primary Examiner* — Eric Myers
(74) *Attorney, Agent, or Firm* — BakerHostetler (57) ABSTRACT

The present disclosure relates to configuring and operating Internet of things (IoT) elements connected by a network. A computing device receives a request to generate a rule for coordinating operation of a plurality of IoT elements. The computing device determines whether the request satisfies restrictions as described in descriptions of interface components of the plurality of IoT elements in the computing device by referencing descriptions of interface components. The interface components correspond to the plurality of IoT elements. The computing device generates the rule responsive to determining that the request satisfies the restrictions, and sends an action signal over the network based on the rule to operate one or more of the plurality of IoT elements.

21 Claims, 5 Drawing Sheets

(56) References Cited

U.S. PATENT DOCUMENTS

| | | |
|---|---|---|
| 9,600,571 B2 | 3/2017 | Shaashua et al. |
| 2008/0256014 A1 | 10/2008 | Gould et al. |
| 2010/0138007 A1 | 6/2010 | Clark et al. |
| 2010/0162210 A1 | 6/2010 | Briden et al. |
| 2010/0175010 A1 | 7/2010 | Jeyabalan et al. |
| 2011/0276908 A1 | 11/2011 | O'Riordan |
| 2014/0047322 A1 | 2/2014 | Kim et al. |
| 2014/0244833 A1 | 8/2014 | Sharma et al. |
| 2015/0019710 A1 | 1/2015 | Shaashua et al. |
| 2015/0019714 A1 | 1/2015 | Shaashua et al. |
| 2016/0041534 A1 | 2/2016 | Gupta |
| 2016/0043962 A1 | 2/2016 | Kim et al. |
| 2016/0044032 A1 | 2/2016 | Kim et al. |
| 2016/0048114 A1 | 2/2016 | Matthieu et al. |
| 2016/0065653 A1 | 3/2016 | Chen et al. |
| 2016/0080932 A1 | 3/2016 | Jin et al. |
| 2016/0112240 A1* | 4/2016 | Sundaresan ............ H04W 4/90 726/1 |
| 2016/0135241 A1 | 5/2016 | Gujral et al. |
| 2016/0147402 A1 | 5/2016 | Muench |
| 2016/0173293 A1 | 6/2016 | Kennedy |
| 2016/0179993 A1 | 6/2016 | Maturana et al. |
| 2016/0182309 A1 | 6/2016 | Maturana et al. |
| 2016/0226732 A1 | 8/2016 | Kim et al. |
| 2016/0241445 A1 | 8/2016 | Kim |
| 2016/0255066 A1* | 9/2016 | Green ................... H04W 4/005 726/4 |
| 2016/0308861 A1 | 10/2016 | Ameling et al. |
| 2016/0357522 A1 | 12/2016 | Wee et al. |
| 2016/0357524 A1 | 12/2016 | Maluf et al. |
| 2016/0379464 A1* | 12/2016 | Sedayao ................ G08B 21/22 340/686.6 |
| 2017/0005820 A1 | 1/2017 | Zimmerman et al. |
| 2017/0024290 A1* | 1/2017 | Kaulgud ............. G06F 11/1479 |
| 2017/0026472 A1 | 1/2017 | Bugenhagen et al. |
| 2017/0048476 A1 | 2/2017 | Freiin et al. |
| 2017/0052688 A1 | 2/2017 | Evans et al. |
| 2017/0063611 A1 | 3/2017 | Sheba et al. |

OTHER PUBLICATIONS

Nest Labs, "API Introduction," Archived on web.archive.org on Jun. 26, 2014, 5 Pages, [online] [retrieved on Jan. 18, 2017] Retrieved from the internet <URL:http://web.archive.org/web/20140626020517/https:/Ideveloper.nest. com/documentation/nest-apiintro# close>.

* cited by examiner

PLATFORM FOR CONTROLLING AND OPERATING NETWORK CONNECTED DEVICES

CROSS-REFERENCE TO RELATED APPLICATION

This application claims priority under 35 U.S.C. § 119(e) to U.S. Provisional Patent Application Ser. No. 62/206,467, entitled "Platform for Controlling and Operating Internet of Things (IoT)," filed Aug. 18, 2015, which is incorporated herein by reference in its entirety.

BACKGROUND

1. Field of the Disclosure

This disclosure pertains in general to internet of things, and more specifically to system for configuring and operating internet of things (IoT).

2. Description of the Related Art

In recent years, more and more objects (or things) are being connected to a network infrastructure. Such expanded network of connected objects is often referred to as the internet of things (IoT). The IoT enables interoperability between objects connected to the network as well as expanding user's capability to collect information and/or control operations of these various network of objects. The objects (or things) in IoT include traditional computers or networking devices, as well as devices such as lamps, audio/video (AV) players, thermometers, lawn sprinklers, and vehicles, which were conventionally used as stand-alone devices.

The number and variety of objects (or things) connected to the network has grown exponentially over the years. Typically, different types of objects have different capabilities, functions and attributes. Moreover, different objects often communicate using different protocols. Such protocols include device to device (D2D) communication protocols, device to server (D2S) communication protocols and server to server (S2S) communication protocols.

Due to such diversity in the IoT devices and protocols, it is a daunting task for a user to design and implement a desired configuration of a network of IoT devices. The user not only needs to navigate through different protocols but also needs to fully understand the capabilities, functions and attributes to control multiple IoT devices to configure these devices to operate as desired.

SUMMARY

Embodiments relate to operating Internet of things (IoT) elements connected by a network. A computing device receives a request to generate a flow including a suite of rules for coordinating operation of a plurality of IoT elements. The computing device determines whether the request satisfies restrictions as described in descriptions of interface components of the plurality of IoT elements in the computing device by referencing descriptions of interface components. The interface components correspond to the plurality of IoT elements. The computing device generates the flow responsive to determining that the request satisfies the restrictions, and sends an action signal over the network based on the flow to operate one or more of the plurality of IoT elements.

In one embodiment, a computing device may include, a processor, a rule management module, and a translation layer. The rule management module receives a request to generate a flow including a suite of rules for coordinating operation of a plurality of IoT elements. The rule management module determines whether the request satisfies restrictions as described in descriptions of interface components of the plurality of IoT elements in the computing device by referencing descriptions of interface components. The interface components correspond to the plurality of IoT elements. The rule management module generates the flow responsive to determining that the request satisfies the restrictions. The translation layer sends an action signal over the network based on the flow to operate one or more of the plurality of IoT elements.

In one embodiment, a non-transitory computer-readable storage medium storing instructions of operating Internet of things (IoT) elements connected by a network thereon, when executed by a processor, cause the processor to receive a request to generate a flow including a suite of rules for coordinating operation of a plurality of IoT elements, The instructions are further configured to cause the processor to determine whether the request satisfies restrictions as described in descriptions of interface components of the plurality of IoT elements in the computing device by referencing descriptions of interface components. The interface components correspond to the plurality of IoT elements. The instructions are further configured to cause the processor to generate the flow responsive to determining that the request satisfies the restrictions; and to send an action signal over the network based on the flow to operate one or more of the plurality of IoT elements.

The features and advantages described in the specification are not all inclusive and, in particular. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

IoT is formed using multiple devices and services that exchange data over a network infrastructure. These devices and services may have various attributes, functions and capabilities, and often involves interplay between different parties such as developers or manufacturers of the devices, operators of the services, and end-users of the devices. Such diversity in devices and services as well as different interests of the involved parties have led to the use of different control schemes and protocols for different IoT devices and services (these devices and services of IoT are hereinafter collectively referred to as "elements").

Embodiments described herein relate to a unified control platform that enable coordinated operations of IoT elements by processing events and commands of a plurality of disparate IoT elements with different properties, capabilities (e.g., protocol capabilities) and functions. The unified control platform stores rules for taking various actions based on detection of events or satisfying of one or more conditions.

IoT elements may include network-connected objects for performing various functions. Such network-connected objects may be used for collecting information (e.g., temperature, activity level, and humidity) as well as taking actions (e.g., turning on a device, increasing or decreasing power, and posting information on social networking services). These objects may operate based on different protocols, interfaces, and application programming interfaces (APIs). IoT elements may also include network-based services. These services may be operated by various entities, which may include the manufacturer or developer of IoT objects. Such services may include, but is not limited to, social networking services (e.g., Facebook and Twitter) and services provided by manufacturer's websites.

Overview of the Architecture

Figure 1:
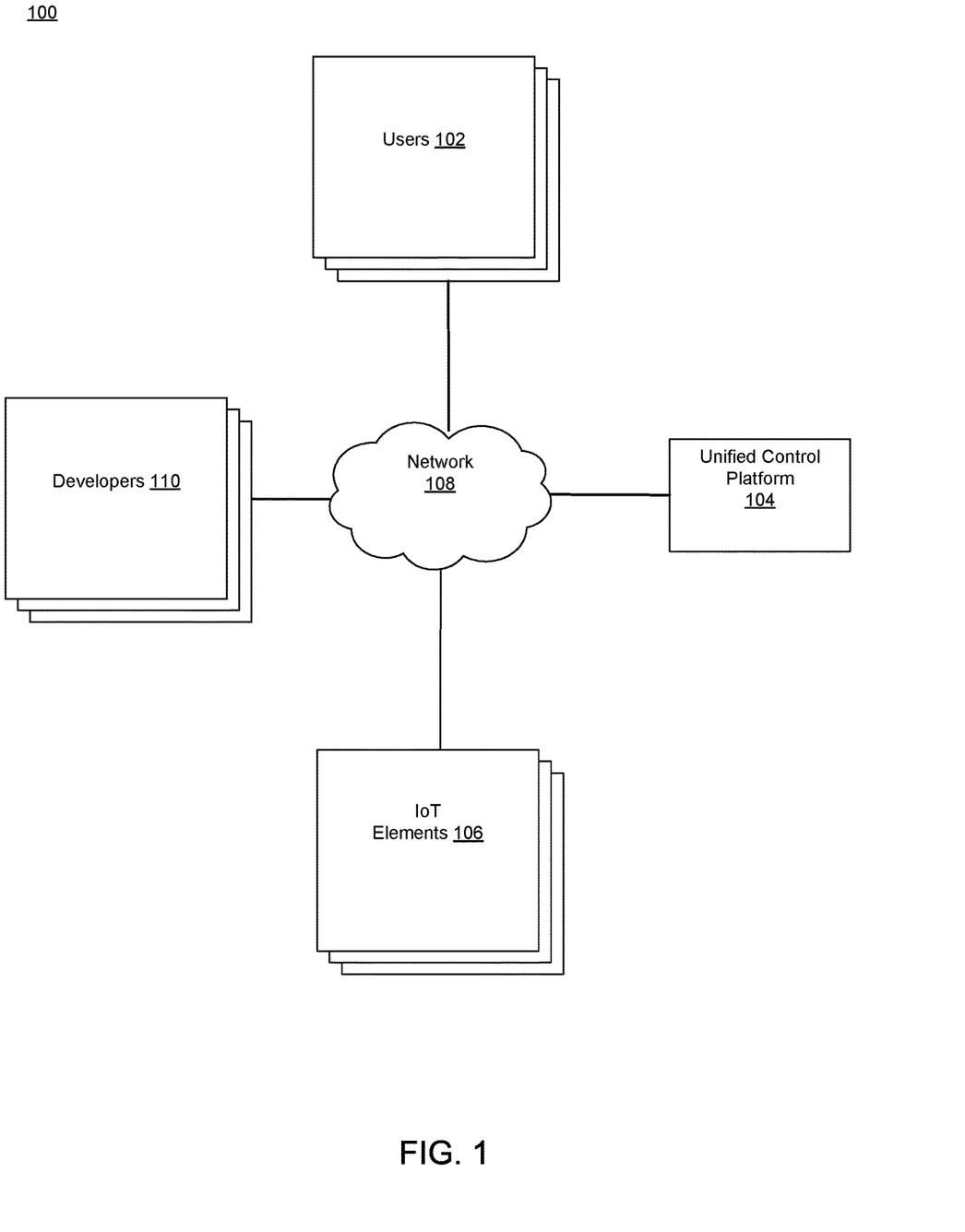
FIG. 1 is a high-level block diagram of a system using a unified control scheme, according to one embodiment.

FIG. 1 is a high-level block diagram of a system 100 using a unified control scheme, according to one embodiment. The system 100 may include, among other components, users 102, a unified control platform 104, IoT elements 106, developers 110 and a network 108 connecting these components of the system 100. Although the unified control platform 104 is illustrated in FIG. 1 as a single component, the unified control platform 104 may be a distributed system with multiple computing devices dispersed throughout the network 108.

The unified control platform 104 provides a user 102 with integrated control and operation functionality for various IoT elements 106 and also communicates with the users 102 to generate rules defining operations of IoT elements 106 associated with the users 102, as described below in detail with reference to FIGS. 2A and 2B. In some embodiments, the unified control platform 104 is based on an event-driven architecture where interfacing, controls, operation and management of elements 106 are based on events.

A user 102 may download and install a client application of the unified control platform 104 on a user device to establish rules for controlling the IoT elements 106 using the unified control platform 104, send events to the unified control platform 104 and/or receive messages from the unified control platform 104. Alternatively, the client application may be a browser or other programs preinstalled on the user device, in which case no separate installation of the client application is needed. Each user 102 may have control over or interact with a subset of IoT elements 106. Some IoT elements (e.g., social networking services) may be associated with more than one user 102 while others may be associated with a single user. The user 102 may purchase IoT elements 106 from developers or manufacturers (collectively referred to as "developers 110" hereinafter) and deploy these elements 106 for use at one or more physical locations. The client application executed on the user device may also generate user interfaces on a screen of the user device for generating rules for operating the elements 106, as described below in detail with reference to FIG. 4.

Developers 110 provide interface components and manifests corresponding to the IoT elements 106. An interface component is a software component associated with an IoT element to translate element-specific events, protocols, and commands (received or sent to the IoT element) into unified events and commands for processing in the unified control platform 104. The interface component may also encapsulate computation logic specific to an IoT element, for example, by performing a predetermined computation. Interface components can be expressed in various languages or frameworks such as Java, Python, C#, Ruby, and Node.js. Each interface component is associated with a corresponding manifest that describes properties, capabilities, functions and other information that enables the unified control platform 104 to model a corresponding IoT element for interoperability with other IoT elements or users, as described in detail with reference to FIG. 2B. Developers 110 may be manufacturers of IoT elements 106 or other entities having knowledge about the capabilities, properties and functions of the IoT elements. Developers 110 can create, submit, edit, and update interface components and manifests of elements 106 and make them available for use in conjunction with the unified control platform 104. By having the developers 110 produce interface components and manifests, the developers can retain a tight control over how the IoT elements can be used and configured using the unified control platform 104 while relieving the users 102 and the operator of the unified control platform 104 of the need to deeply understand the capabilities, properties and functions of the IoT elements.

The network 108 may be a wireless or a wired network. The network 108 can be based on technologies including, but not limited to, Ethernet, 802.11, worldwide interoperability for microwave access (WiMAX), 4G, digital subscriber line (DSL), asynchronous transfer mode (ATM), InfiniBand, PCI Express Advanced Switching, multiprotocol label switching (MPLS), a Global System for Mobile Communications (GSM), General Packet Radio Service (GPRS), Enhanced Data Rates for GSM Evolution (EDGE), Universal Mobile Telecommunications System (UMTS), Evolution-Data Optimized (EV-DO), Code Division Multiple Access (CDMA), Z-Wave, Zigbee and Bluetooth low energy (BLE).

Example Architecture of Unified Control Platform

Figure 2A:
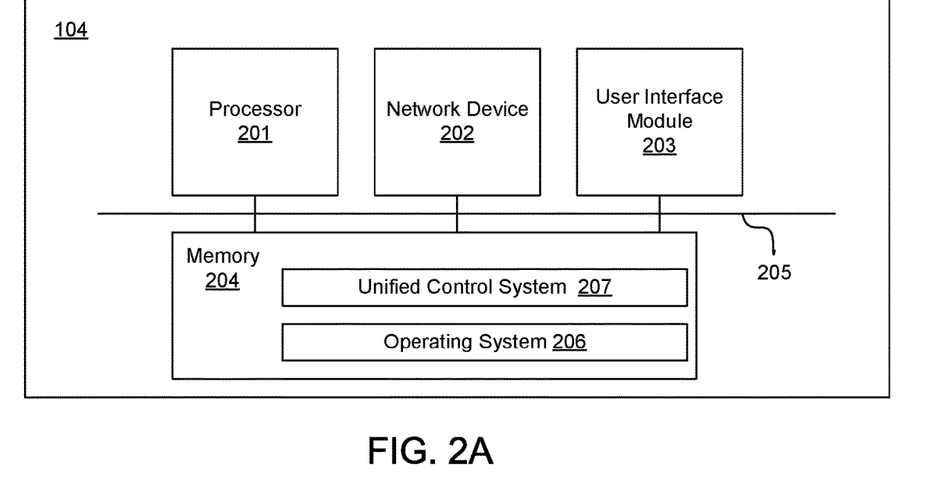
FIG. 2A is a block diagram of the unified control platform, according to one embodiment.

FIG. 2A is a block diagram of the unified control platform 104 according to one embodiment. The unified control platform 104 may include, among other components, a processor 201, a network device 202, a user interface module 203, a memory 204 (i.e., a non-transitory computer-readable storage medium) and a bus 205 connecting these components.

The processor 201 executes instructions to perform operations on the unified control platform 104. At least part of the executed instructions is stored in the memory 204.

The memory 204 stores software modules including an operating system 206 and a unified control system 207. The operating system 206 manages resources available in the unified control platform 104. The unified control system includes software modules for configuring and executing rules for controlling IoT elements 106, and interacting with developers 110 and users 102, as described below in detail with reference to FIG. 2B.

The network device 202 may include hardware, software, firmware and a combination thereof for communicating with the elements 106, the users 102 and the developers 110 over the network 108. The network device 202 may be embodied as a network card.

Figure 2B:
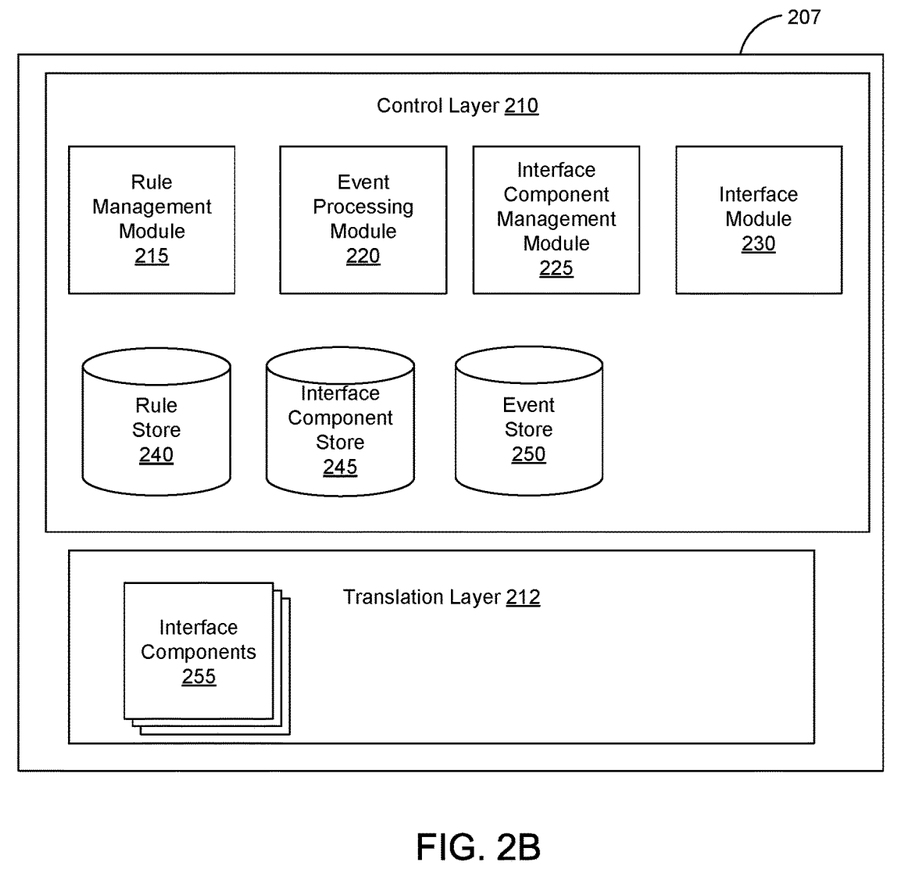
FIG. 2B is a block diagram of the unified control system, according to one embodiment.

FIG. 2B is a block diagram of the unified control system 207, according to one embodiment. The unified control system 207 may include, among other software components, a control layer 210 and a translation layer 212. The control layer 210 is responsible for interacting with the user 102 to set up rules for operating the elements 106 and executing these rules after they are set up by the user 102. The translation layer 212 serves as a bridge between the control layer 210 and elements 106 using unified events and commands.

The control layer 210 may include, among others, a rule management module 215, an event processing module 220, an interface component management module 225, an interface module 230, a user interface module 235, a rule store 240, an interface component store 245, and an event store 250. Other embodiments may have different and/or additional modules other than what is described with reference to FIG. 2B. Furthermore, the functionalities of these modules can be distributed among the modules in a different manner.

The translation layer 212 includes a plurality of interface components 255 to interface with the corresponding elements 106. In one or more embodiments, the translation layer 212 includes the same number of interface components 255 as the number of IoT elements 106 so that a one-to-one relationship is established between each interface component 255 and its corresponding IoT element 105. In other embodiments, a single interface component may represent multiple IoT elements.

An interface component may include, for example, three parts: an IoT element connector, a data processor and a control layer connector. The IoT element connector is software code that interfaces with a corresponding IoT element and communicates with the corresponding IoT element using an API specific to the element. The control layer connector is software code that connects and interfaces with the control layer 210. The control layer connector sends events and commands to the control layer 210 and receives unified events and comments from the control layer 210 using an API that is common across different interface components. The data processor is software code that performs data processing including, parsing, computing, and polling. Interface components and the IoT element connectors, data processors, and control layer connectors are described below in detail with reference to FIG. 3.

In one or more embodiments, an interface component may be deployed for an IoT element that is not yet physically deployed. Instead, an interface component may represent a virtual IoT element and enable an interface component management module 225 to simulate actual deployment of the element 106.

The rule management module 215 creates, stores, and manages rules for controlling elements 106 per instructions from the users 102. A rule describes conditions (e.g., occurring of triggering events) and actions as a result of satisfying certain conditions. For example, a rule may describe turning on an IoT element (action) when a certain time is reached (condition). The rule management module 215 may associate a user with rules created by the user and store such association in the rule store 240. In addition, when a user requests updating or deleting of an existing rule, the rule management module 215 updates or removes the existing rule in the rule store 240. Details of how the rule management module 215 creates, stores, and manages rules are described in detail with reference to FIG. 5.

The rule store 240 is a storage module for storing the created rules. The rules stored in the rule store 240 may be accessed by the event processing module 220 to process events and generate commands. The rule store 240 may also identify users authorized to use each rule.

The event processing module 220 processes events to control the elements 106 according to the rules stored in the rule data store 205. Events are messages communicated within the unified control platform 104 and may indicate, for example, temperature changes, receiving of a new email, and reaching a certain time limit. Events may be generated by interface components 255, the translation layer 212, the rule management module 215 as well as the interface module 230. The event may be in the form of an event packet which includes, for example, a source of the event, a destination of the event, a timestamp indicating when the event packet was generated, a protocol associated with the event, the user associated with the event, and a payload. The payload describes additional information about the event and content dependent on the event's protocol. The file content of the event packet may be expressed in JavaScript Object Notation (JSON), or a similar widely-used format. In some embodiments, events are not processed in real time. In such embodiments, event packets not yet processed may be stored in the event store 250 and then be routed to proper destinations for further processing. After processing the events, the event processing module 220 may send commands, when conditions are met, to the interface components 225 to cause predetermined actions at the corresponding elements 106. Details of how the event processing module 220 processes events are described in detail with reference to FIG. 6. The event processing module 220 may be embodied as a processor and a software component where the software component can be a modified version of DROOLS available from Red Hat, at Raleigh, N.C.

The interface component management module 225 registers, stores, and manages interface components and their corresponding manifests. A manifest provides information associated with various aspects of a corresponding interface component. In some embodiments, the interface components 255 are hosted and deployed in the translation layer 212 after being registered by the interface component management module 225. The interface components 255 are included in the translation layer 212 after being registered by the interface component management module 225. In other embodiments, the interface components 255 are hosted in other platform (e.g., a trusted partner server) or even the IoT elements themselves. In various embodiments, a manifest includes the following fields: (i) metadata, (ii) API details, (iii) UI information. The metadata describes the attributes of an IoT element or its associated interface component. The API details field includes information about the API installed on the IoT element. The API details field includes a security information subfield. The security information describes the security-related items such as authentication methods. The UI information field includes subfields: (i) control information, and (ii) triggers and actions. The UI information may include information such as positions of a UI element, dimensions of the UI element, identification of UI element (e.g., image, checkbox, dropdown menu), properties associated with the UI element (e.g., appearance, value and range). The control information and triggers and actions include information about how IoT elements can be operated. The methods specified in the control information and triggers and actions indicate to the unified control platform how an element can be operated.

After being registered, interface components 255 interface between the control layer 210 and the IoT elements 106 using a common API. In one or more embodiments, the interface components 255 maintain connections with the elements 106 and periodically retrieve updates from the elements 106 to maintain the states of the elements 106.

In some embodiments, an IoT element 106 can interface via one or more interface components, some of which may be provided by different developers. Each of the interface components corresponding to the same IoT element 106 may enable users to take advantage of different sets of functionalities or capabilities of the IoT elements.

The interface component management module 225 registers an interface component when it becomes newly available to the unified control system 207 or when the interface component becomes updated. When an interface component 255 is submitted by a developer, the interface component management module 225 registers the interface component 255 using manifest corresponding to the interface component 255. During the registration process of an interface component, the interface component management module 225 may (i) assign an interface component identify (ID) to the interface component, (ii) store the interface component 255 with the associated ID in the interface component store 245, (iii) retrieve manifests associated with the interface components, (iv) extract information from the manifests, (v) make a subset of information in the manifests available to the client application on user devices and (vi) identify security methods and protocols (e.g., OAuth and OAuth2) if any, to be use used with an IoT element corresponding to the interface component. In one embodiment, the interface component 255 is registered at the interface component management module 225 by calling a specific uniform resource locator (URL) and submitting a developer API key for authentication to the interface component management module 225.

The interface module 230 manages connections with the users 102 and developers 110. The interface module 230 performs user authentication and user account management functions so that authorized users and developers can access, modify and remove rules, interface components and manifests in unified control platform 104. The interface module 230 (i) sends messages from the event processing module 220 to a user, (ii) throttles and load balances incoming requests to prevent requests overloading the unified control platform 104, and (iii) directs a request to a proper module for further processing. For example, a client's request to create a rule is directed to the rule management module 215 for processing, and a developer's request to update an interface component is directed to the interface component management module 225 for processing.

In addition, the interface module 230 provides a subset of information in the manifest to the client application. The subset of information may include all or part of metadata, all or part of API details and user interface (UI) information. The UI information enables the users 102 to set rules and configure the elements 106 using, for example, a graphical user interface on the user device. The interface module 230 may also provide software code for preparing manifests to the developers 110. In one or more embodiments, the developer may decide which parts of the metadata should be sent to the client application 408 while other parts of the metadata should be retained in the unified control platform 104 and not made publicly available.

Example Structure of an Interface Component

Interface components are associated with IoT elements and represent IoT elements. An interface component acts as the interface between an IoT element and the control layer 210 of the unified control system 207. Interface components are included in the translation layer 212 of the unified control system 207. In various embodiments, interface components are provided by developers 110 and accompanied with manifests. Interface components can be hosted by the unified control system 207 or by the developers 110. In some embodiments, an interface component can generate multiple instances of interface components to interface with IoT elements such that each interface component included in the translation layer 212 maintains a one-to-one relationship with an IoT element. For example, an interface component for a particular type of lamp can generate multiple instances of interface components each of which interfaces with a physical lamp.

Figure 3:
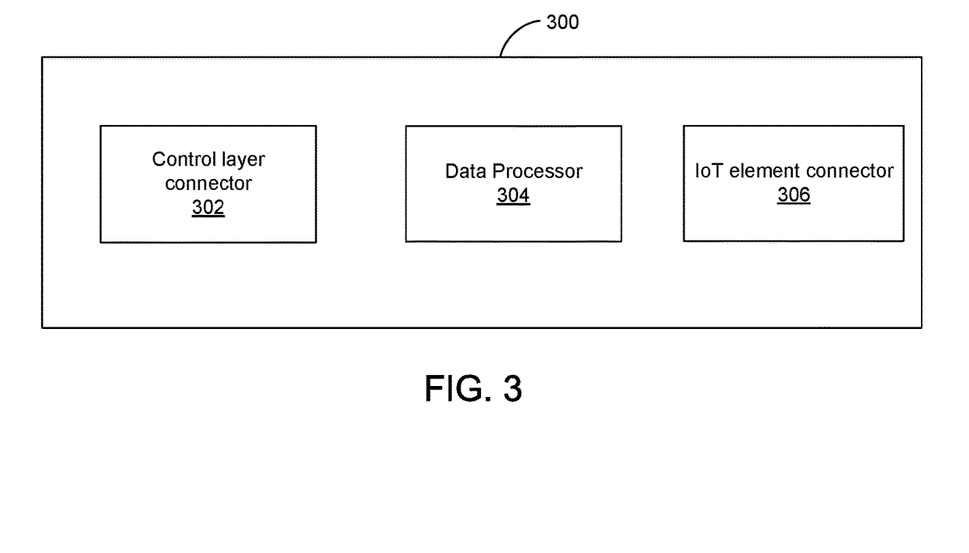
FIG. 3 is a block diagram illustrating an example structure of a manifest, according to one embodiment.

FIG. 3 is a block diagram illustrating an example structure of an interface component 300, according to one embodiment. Interface component 300 includes a control layer connector 302, a data processor 304, and an IoT element connector 306. The control layer connector 302 is an abstraction layer between IoT elements 106 and the control layer 210. The control layer connector 302 receives events and commands from the control layer 210 and sends events and commands to the control layer 210. Because the interface component 300 includes a control layer connector 302 that interfaces with the control layer 210, the interface component 300 can be updated without affecting the control layer 210. Accordingly, the control layer 210 can be maintained as an unchanging API even when functionalities, configuration or capabilities of IoT elements are updated or modified.

The data processor 304 analyzes data including events and commands that the control layer connector receives from the control layer 210. The events and commands received from the control layer 210 are processed by the data processor 304 to generate events and commands specific to an IoT element. In various embodiments, the manifest accompanying an interface component provides information regarding the interface component such as how the control layer 210 can interact with the IoT element. Based on the information specified in the manifest, the control layer 210 accordingly sends to the interface component 300 events and commands to cause the interface component to generate events and actions that can operate and control the IoT. The data processor 304, according to the events and commands received from the control layer 210, generates events and commands configured to cause the IoT element to perform and operate as specified.

The IoT element may be operated and controlled by these commands. In addition, the data processor 304 polls information from an IoT element periodically to update and maintain its knowledge of the IoT element. In some embodiments, the data processor 304 may obtain all data from an IoT element and processes the data to determine any update. In some embodiments, the data processor 304 may obtain only new data from an IoT element. For example, the data processor 304 periodically obtains the state (e.g., on or off) information from a lamp. The data processor 304 may process information obtained from an IoT element and retain information about the IoT element such as manufacturer, install date, number of times it has been turned on and off, and the like. The data processor 304 may process information received from the IoT element to generate and provide unified events to the control layer 210. As such, the control layer 210 maintains up-to-date knowledge of the IoT element.

The IoT element connector 306 interfaces with an IoT element using the interface (e.g., API) specific to the IoT element. The IoT element 306 allows an interface component 300 to maintain connection with the IoT element. The IoT element connector 306 sends commands specific to the IoT element and receives events from the IoT element. The IoT element connector 306 may receive from the IoT element events when the data processor 304 polls.

Because interface component is a software component associated with an IoT element that represents the IoT element, users 102 may simulate an IoT element before acquiring it by using interface components associated with the IoT element. That is, a user 102 may interact with the interface component associated with an IoT element even when the user 102 does not have the physical possession of the IoT element. As the manifest associated with the interface component provides information including metadata, API details, and UI information to the control layer 120, a user may interact with the interface component in lieu of the IoT element associated with the interface component and simulate the installation and operation of the IoT element. For this purpose, the control layer connector 302 and the data processor 304 may replicate actions and operations of an IoT element. In addition, developers 110 may validate an interface component associated with an IoT element by simulating the deployment of IoT element before providing it to the unified control platform 104. An interface component may be validated via simulation to ensure that it can accurately represent the IoT element it is associated with.

Example User Device

Figure 4:
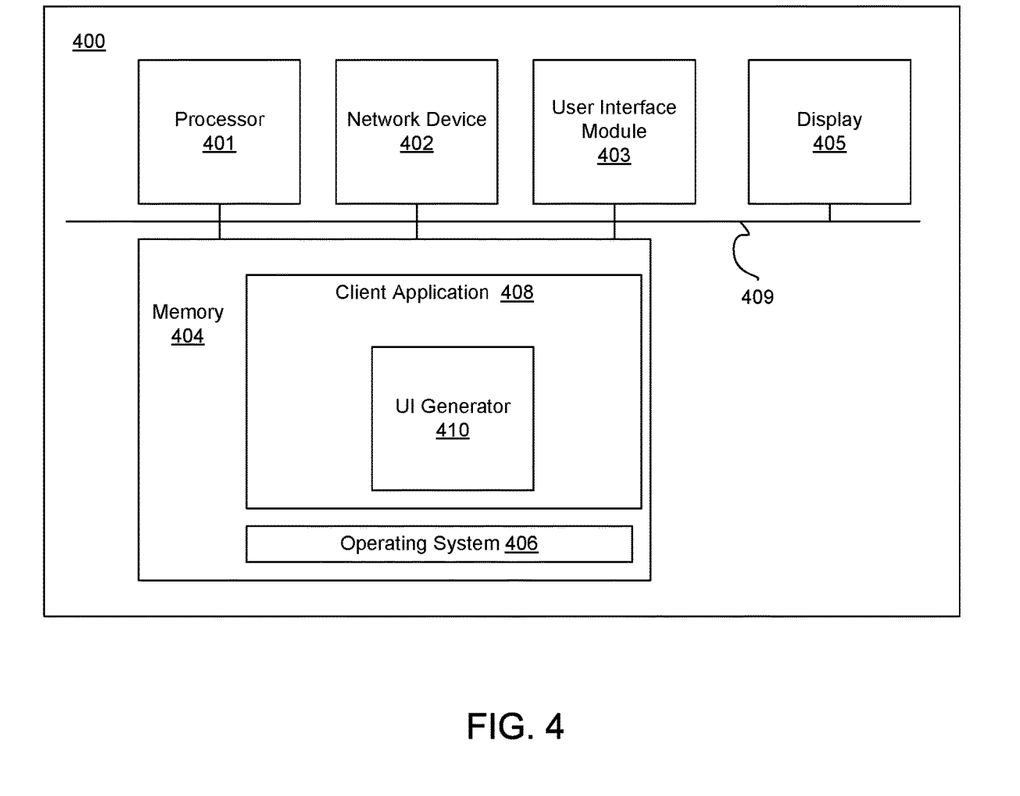
FIG. 4 is a block diagram illustrating a user device for accessing the unified control platform, according to one embodiment.

FIG. 4 is a block diagram illustrating a user device 400 for accessing the unified control platform 104. The user device 400 is used by a user 102 to define rules, send events and commands to the unified control platform 104, and receive messages from the unified control platform 104. The user device 400 may be a computing device such as a cellphone, a smart phone, a tablet, a laptop and a wearable device. The user device 400 may include, among other components, a processor 401, a network device 402, a user interface module 403, a display 405, a memory 404 (i.e., a non-transitory computer-readable storage medium), and a bus 409 connecting these components.

The processor 401 executes commands to perform various operations on the user device 400. The operations include processing messages received from the unified control platform 104 and communicating with the unified control platform 104 to define and execute rules for controlling the IoT elements 106.

The network device 402 may include hardware, software, firmware and a combination thereof for communicating with the unified control platform 104 over the network 108. The network device 402 may be embodied as a network card.

The user interface module 403 is hardware that may be combined with software and/or firmware for receiving user input from the user. The user interface module 403 may include touch screens, keyboards, keypads, and pointing devices (e.g., mouse).

The display 405 is hardware that may be combined with software and/or firmware to display user interface elements to the user. The display 405 may be embodied using liquid crystal display (LCD), organic light emitting diodes (OLED), and bistable display technology.

The memory 204 stores software modules including an operating system 406 and a client application 408 for the unified control platform 104. The operating system 206 manages resources available in user device 400. The client application 408 is a software module for communicating with the unified control platform 104 to perform various operations associated with controlling the IoT elements 106. The client application 408 enables users to access the unified control platform 104, set up rules to operate one or more IoT elements 106, and display messages from the unified control platform 104 to the user.

In one embodiment, the client application 408 includes a user interface (UI) generator 410 for generating various graphical user interface elements. The UI generator 410 generates and displays various screens on the display 405 such as (i) a grid screen used for configuring rules for operating the IoT elements 106 and (ii) an interface component/element detail screen showing events, actions, functions and capabilities of an IoT element. Such grid screen or the interface component/element detail screen is generated using the UI information 307 extracted from a corresponding manifest.

Method of Managing Rules

Figure 5:
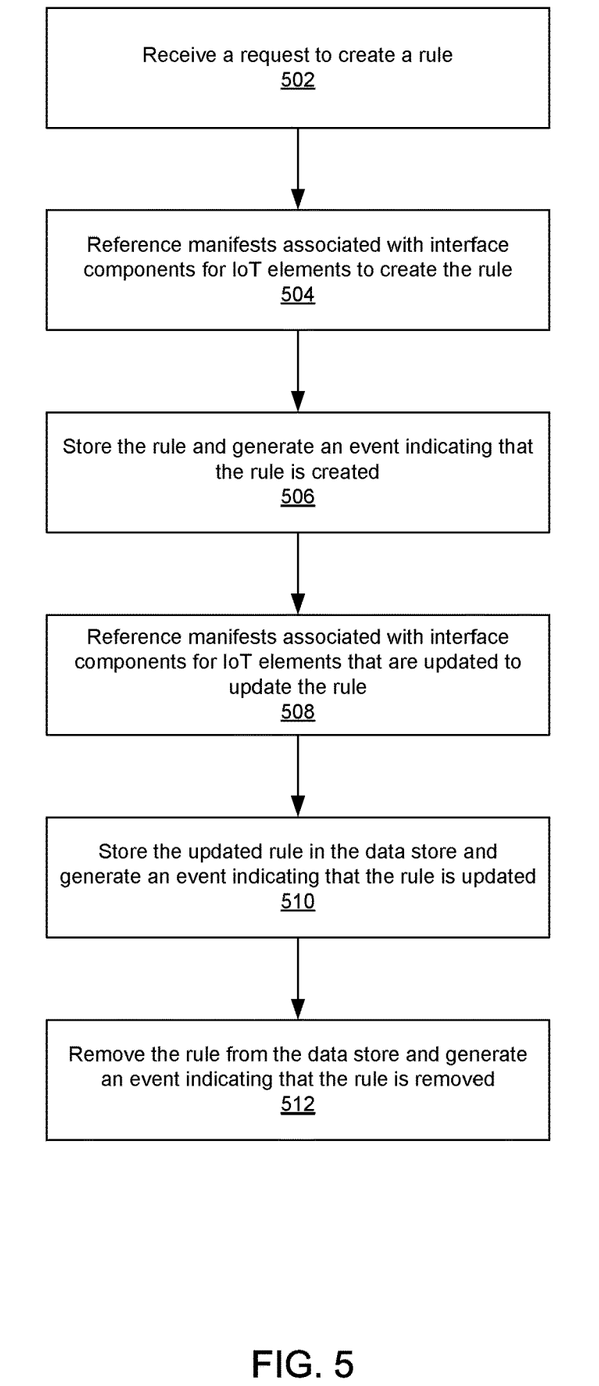
FIG. 5 is a flowchart illustrating a process of managing a rule, according to one embodiment.

FIG. 5 is a flowchart illustrating a process of managing a rule, according to one embodiment. The rule management module 215 receives 502 a request from a user 102 to create a rule (or a flow including a suite of rules) for controlling one or more IoT elements 106. The user 102 may take actions on the user device 400 using UIs generated and presented on its screen 405 to request creation of a rule (or a flow including a suite of rules), as described above with reference to FIG. 4. In one embodiment, the UI is presented to the user 102 on the user device 400 based on the UI information (e.g., triggers and actions, or control information) included in the manifests associated with the interface components for the one or more IoT elements. Hence, the user 102 is given guidance via the UIs on what triggers and actions can be requested on the IoT element 106. Information other than UIs may also be provided to the user device 400 so that the user 102 is prevented from making a request that is not compatible or permissible on IoT elements 106. If the request is determined to be permissible and compatible at the user device 400, the request made on the user device 400 is sent to the rule management module 215 via the interface module 230.

The rule management module 215 references 504 the manifest(s) associated with interface component(s) for the IoT elements involved in the rule (or flow) requested for creation. The rule management module 215 creates the rule (or flow) when the user's request satisfies restriction(s) as described in the manifest(s). When the user 102 attempts to create a rule (or flow) via the UI on the user device 400 to control the one or more IoT elements, the user 102 triggers sending information associated with triggers and actions of the one or more IoT elements to the rule management module 215. The rule management module 215, when creating a rule (or flow), references the manifest(s) associated with interface components of the IoT elements 106 the user 102 desires to operate or control. A rule (or flow) defines a set of condition(s) (e.g., occurring of triggering event(s)) and action(s) to be taken when the condition(s) are satisfied.

The rule management module 215 stores 506 the rule (or the suite rules included in the flow) in the rule data store 240 and generates an event indicating that the rule (flow) is created. In various embodiments, the rules (flows) generated by the user are associated with the users in the rule data store

240. In some embodiments, a flow that includes a suite of rules is stored as a flow of conditions and actions expressed in JavaScript Object Notation (JSON), or a similar widely-used format. An example flow is provided in Appendix A. The event indicating that the rule (flow) is created is processed by the event processing module 220, which routes the event to the interface module 230. The interface module 230 sends a notification to the user device 400 so that the user device 400 can present a UI indicating that the rule has been created on its display 405. In some embodiments, the rule (flow) may be constructed and presented to the user as a graph, a workflow and the like via the UI when the user creates the rule (flow). After a rule (flow) is created, the rule (flow) may be initiated by the user via the user device 400. Then, the event processing module 220 may start processing rules by determining whether triggering conditions are satisfied and taking actions according to the triggering conditions.

When the user 102 requests updating of a rule (flow) that has already been created, the rule management module 215 references the manifest(s) associated with the interface component(s) (and the IoT element(s)) associated with the rule (flow). The rule (flow) can be updated when the user 102, for example, changes, removes or adds condition(s), action(s) or IoT element(s) associated with the rule (flow).

A request for updating the rule (flow) is made on the user device 400 by making actions on the UI. Similar to the case of creating a new rule (flow), any changes to the rule (flow) is restricted by the UIs presented on the user device 400 and defined in the manifest of associated IoT element(s). The update to the rule (flow) may also be checked for compatibility or permissibility at the user device based on additional information in the manifest that the user device 400 receives.

The rule management module 215 references the manifest(s) associated with interface components for the IoT elements involved in the rule change to check for compatibility or permissibility. If the update is allowed, the rule management module 215 stores 510 in the rule data store 240 by replacing the existing condition and action with an updated condition and action. For a flow, the rule management module 215 stores 510 in the rule data store 240 by replacing the existing flow of conditions and actions with the updated flow of conditions and actions. In addition, the rule management module 215 generates and sends a notification to the user device 400 indicating that the rule (flow) is updated and is ready for further modification or initiation of the rule.

The rule management module 215 may also remove the rule (flow) from the rule store 240 when the user requests removal of the rule (flow). After removal of the rule (flow) from the rule store 240, a notification can be sent to the client device 400 indicating the removal.

Method of Processing Events

Figure 6:
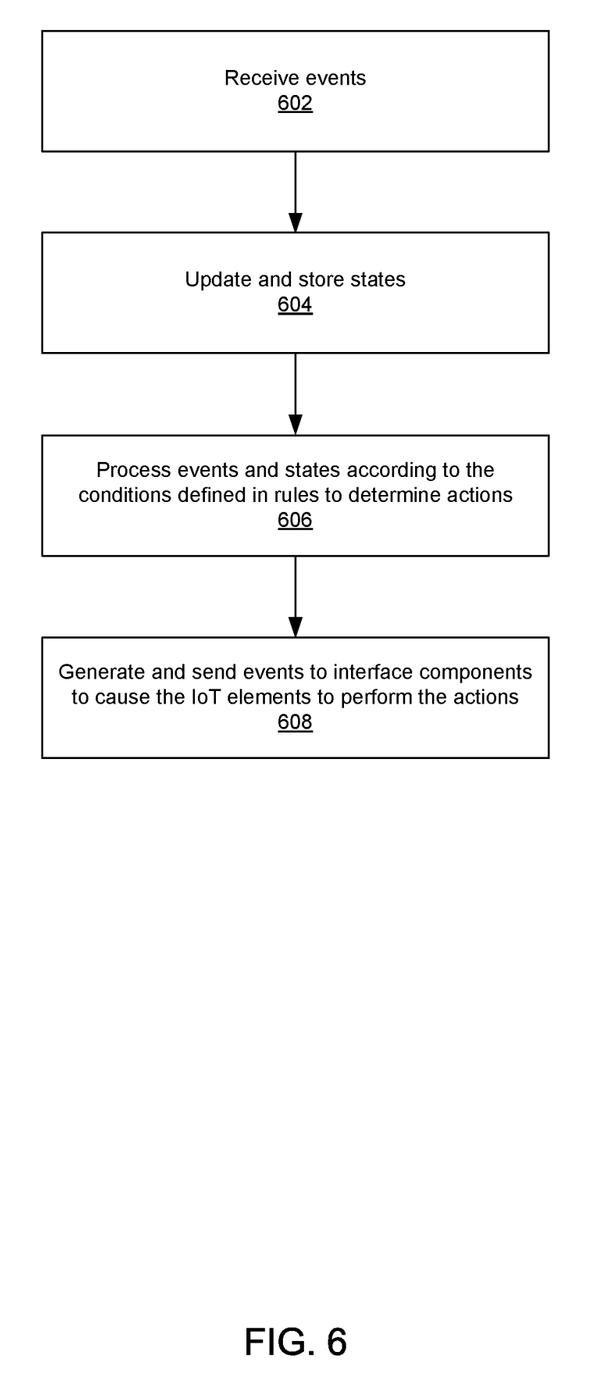
FIG. 6 is a flowchart illustrating a method of processing events at the event processing module, according to one embodiment.

FIG. 6 is a flowchart illustrating a method of processing events at the event processing module 220, according to one embodiment. First, the event processing module 220 receives 602 events and processes these events, sometimes based on states tracked in the event processing module 220.

As described above with reference to FIG. 2B, events are messages communicated within the unified control platform 104. Events may be received from interface components 255, the translation layer 212, the rule management module 215 as well as the interface module 230. In some embodiments, events may be received stored in a queue and processed in a first-in first-out (FIFO) basis. An event is an action or occurrence that may be handled by the event processing module 220. The event processing module 220 stores events in the event store 250.

The event processing module 220 updates and stores 604 states. States tracked in the processing module 220 indicate the state(s) of condition(s) associated with the rules (or a flow). The states tracked by the processing module 220 may also describe the progress of the flow. For example, if a flow includes three steps, the processing module 220 recognizes a current step of the flow being processed. The states may indicate states of IoT elements (e.g., a lamp is on or off) or states detected by IoT elements (e.g., temperature is over 100 F, a notice is posted on a social networking service). Because the condition(s) defined by rules (flows) may be complex, the event processing module 220 tracks the state(s) (i.e., whether satisfied or not) associated with the rules (flows) to ensure that rules (flows) are processed accurately.

As one example, a user creates a rule indicating the action of the air conditioner turning on under the conditions that (i) the time is after 5 pm and (ii) only when the user is at home. When the user gets home at 4 pm, the second condition is met and an event is generated to indicate so. However, the air conditioner should not be turned on because the first condition is not yet met. The event processing module 220 tracks the state of the second condition, for example, based on the user's cellphone GPS location. As such, when the user stays at home between 4 pm and 5 pm, no additional events are generated to indicate that the user condition is met. When the time reaches 5 pm, the event processing module 220 determines that both the user and time conditions are met and hence, generates an action to turn on the air conditioner.

The event processing module 220 processes 606 events and states according to the conditions defined in rules. That is, the event processing module 220 processes rules only in response to conditions that would trigger actions as defined in the rule. The rules defined by the users are processed only when the conditions are met.

The event processing module 220 generates and sends 608 events to interface components when the conditions are met. The interface components, in response to receiving the events from the event processing module 220, generate commands or events to trigger the one or more IoT elements to perform actions as defined in the rule.

In various embodiments, the event processing module 220 includes multiple rule processing sub-modules, each dedicated to a single user. Each rule processing sub-modules may be assigned separate resources. Hence, even when the rule processing sub-module for one user is consumed by requests and processing for one user, other rule processing sub-modules can continue to effectively service other users. In one embodiment, the user-based rule processing sub-module is deactivated after completing processing of a rule for a particular user 102.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure.

APPENDIX A

```
// package is a container for this flow (set of rules)
// the name here is R_<userId>_Fl_<flowId>
package R_userlwtvmayb_Fl_is9ElTOGXOmf8PMYtldD;
// include various java-related classes
import org.kie.api.runtime.rule.Match
import com.milla.rules.common.RulesPayload
import com.milla.rules.common.State
import com.milla.rules.common.Constants
import function com.milla.rules.engine.DroolsManager.deleteIfExists
import function com.milla.rules.engine.DroolsManager.printStatus
// declare the RulesPayload class which has an expiry (of 1s) and timestamp ( contained in a field called Ts)
    declare RulesPayload
        @expires( 1s )
        @timestamp( Ts )
    end
    // declare the flow's name
    declare Flow
        @name( 'Flow+timeout' )
    end
    // The first rule in the flow, triggered when the user pushes a button AND the current time is within a specified interval
    rule "is9ElTOGXOmf8PMYtldD-0gwu8gzX5IB0qpaJECvj button1 == on date_time_in_effect == 1"
        @flowId( 'is9ElTOGXOmf8PMYtldD' ) // flow Id used as identifier for this rule
        no-loop true // prevent this rule from triggering itself
    when
        // when the "button pressed" event comes in
        $p1 : RulesPayload( seedId == "57e02a90f6796e40a664f87e150e9f90", seedInstanceId == "VHnimLWdn9RyfEkEIGZK", getAttribute("button1") == "on" )
        // and the flow has not been started
        not(
        State( state == "is9ElTOGXOmf8PMYtldD-0gwu8gzX5IB0qpaJECvj" ) )
        // and the time is within the given interval
        $s3 : State( seedId == "11a8be622b516402a1dc933ed0e44805", seedInstanceId == "6RN3RPOnyHwZKnc64QiT", getAttribute("date_time_in_effect") == "1" )
    then
        // insert a state guard
        State $s4 = new State ( "is9ElTOGXOmf8PMYtldD-0gwu8gzX5IB0qpaJECvj" );
        insert( $s4 );
        // construct a message to send out to trigger some action (this one is a Notification)
        RulesPayload msg = new RulesPayload( "d3e6ddb2548bcd6a9ef26334655bc8b5","WTqM2Jz7jmyX8SuTEl5k"   );
        msg.setIncomingTimestamp( $p1.getIncomingTimestamp( ) );
        msg.setTTL( $p1.getTTL( ) );
        msg.setElementName( "sendPush" );
        msg.setQuickLinkId( "0gwu8gzX5IB0qpaJECvj" );
        msg.setFlowId( "is9ElTOGXOmf8PMYtldD" );
        msg.setRuleName( "is9ElTOGXOmf8PMYtldD-0gwu8gzX5IB0qpaJECvj button1 == on date_time_in_effect == 1" );
        // this is a mechanism for including data from one rosetta to send to another
        msg.setVarInc("VHnimLWdn9RyfEkEIGZK.Button1Name", $p1.getVarInc("Button1Name") );
        msg.setVarInc("VHnimLWdn9RyfEkEIGZK.Button1PressedAt", $p1.getVarInc("Button1PressedAt") );
        msg.setAttribute( "message", "%7B%7BVHnimLWdn9RyfEkEIGZK.Button1Name%7D%7D++pressed+%0A%7B%7BVHnimLWdn9RyfEkEIGZK.Button1PressedAt%7D%7D+");
        // actually send the message to the destination rosetta (the Notification Rosetta)
        msg.sendToRosetta( "userlwtvmayb", "ros3hD80lz6pvRI8WqXLs8rOORjAcklgjJJ_1" );
        // because this is the first rule in the flow, start a timer running which will cause the flow to reset after a period of time
        State $s5 = new State ( "is9ElTOGXOmf8PMYtldD-Timer" );
        insert ( $s5 );
        // send some logging messages out
        String triggers[ ] = {"VHnimLWdn9RyfEkEIGZK", "6RN3RPOnyHwZKnc64QiT"};
        String actions[ ] = {"WTqM2Jz7jmyX8SuTEl5k"};
        printStatus( "userlwtvmayb", "is9ElTOGXOmf8PMYtldD", "quickLink", triggers, actions );
    end
    // this rule converts an incoming "event" message into a "state"
    rule "is9ElTOGXOmf8PMYtldD-11a8be622b516402a1dc933ed0e44805-6RN3RPOnyHwZKnc64QiT RulesPayload2State"
        no-loop true
    when
        $p2 : RulesPayload( seedId == "11a8be622b516402a1dc933ed0e44805", seedInstanceId == "6RN3RPOnyHwZKnc64QiT", getAttribute("date_time_in_effect") == "1" )
        not(
        State( state == "is9ElTOGXOmf8PMYtldD-
```

APPENDIX A-continued

```
s11a8be622b516402a1dc933ed0e44805_6RN3RPOnyHwZKnc64QiT" )   )
        then
             State $s1 = new State ( "is9ElTOGXOmf8PMYtldD-
s11a8be622b516402a1dc933ed0e44805_6RN3RPOnyHwZKnc64QiT",
"11a8be622b516402a1dc933ed0e44805", "6RN3RPOnyHwZKnc64QiT" );
             $s1.setAllAttributes ( $p2.getAllAttributes( ) );
             $s1.setAllVarIncs ( $p2.getAllVarIncs( ) );
             insert ( $s1 );
             delete ( $p2 );
        end
        // this rule uses the incoming "event" message to update the state to represent a change in
that state
        rule "is9ElTOGXOmf8PMYtldD-11a8be622b516402a1dc933ed0e44805-
6RN3RPOnyHwZKnc64QiT RulesPayload Modify State"
             no-loop true
             when
                 $p3 : RulesPayload( seedId == "11a8be622b516402a1dc933ed0e44805",
seedInstanceId == "6RN3RPOnyHwZKnc64QiT" )
                 $s2 : State( state == "is9ElTOGXOmf8PMYtldD-
s11a8be622b516402a1dc933ed0e44805_6RN3RPOnyHwZKnc64QiT", Ts != $p3.getTs( ) )
             then
                 modify ( $s2 ) {
                     setTs( $p3.getTs( ) ),
                     setAttribute( "date_time_in_effect", $p3.getAttribute( "date_time_in_effect"))
                 }
                 delete ( $p3 );
        end
        // This rule is triggered when the user enters a location, after the first conditions have
been meet
        rule "is9ElTOGXOmf8PMYtldD-UFlnayixwWAnbS5pLssR eventType ==
location_enter"
             @flowId( 'is9ElTOGXOmf8PMYtldD' ) // flow Id
             no-loop true // prevent the rule from triggering itself
             when
                   // when I'm in a given location
                 $s8 : State( seedId == "dd414528c1439efba84d6def881a280c", seedInstanceId ==
"gGOruRmH9msGaqWfj3ma", getAttribute("eventType") == "location_enter" )
                 // and I havnt run this rule
                 not(
                 State( state == "is9ElTOGXOmf8PMYtldD-UFlnayixwWAnbS5pLssR" ) )
                 // and I got the "success" message from the preceding action
                 $p6 : RulesPayload( seedId == "d3e6ddb2548bcd6a9ef26334655bc8b5",
seedInstanceId == "WTqM2Jz7jmyX8SuTEl5k", isMillaSuccess( ) )
                 // and I've run the preceding rule
                 $s9: State( state == "is9ElTOGXOmf8PMYtldD-0gwu8gzX5IB0qpaJECvj" )
             then
                 // create the "ive finished" state
                 State $s10 = new State ( "is9ElTOGXOmf8PMYtldD-UFlnayixwWAnbS5pLssR" );
                 insert( $s10 );
                 // create a send a message out
                 RulesPayload msg = new RulesPayload(
"cc4c84e2c7430f7e6b1b78643da52753","HETXVhFWgkNSJs0fNpeh" );
                 msg.setIncomingTimestamp( $p6.getIncomingTimestamp( ) );
                 msg.setTTL( $p6.getTTL( ) );
                 msg.setElementName( "sendEmail" );
                 msg.setQuickLinkId( "UFlnayixwWAnbS5pLssR" );
                 msg.setFlowId( "is9ElTOGXOmf8PMYtldD" );
                 msg.setRuleName( "is9ElTOGXOmf8PMYtldD-UFlnayixwWAnbS5pLssR eventType ==
location_enter" );
                 msg.setAttribute( "subject", "Email+%26+location");
                 // this allows the user to include data from the previous actions
                 msg.setVarInc("gGOruRmH9msGaqWfj3ma.locationMapThumbnail",
$s8.getVarInc("locationMapThumbnail") );
                 msg.setAttribute( "body",
"Got+email+%0ALocation+%7B%7BgGOruRmH9msGaqWfj3ma.locationMapThumbnail%7D
%7D+");
                 // actually send the message out (to an email rosetta)
                 msg.sendToRosetta( "userlwtvmayb", "rosV8PB44ht_1" );
                 // restart the timer
                 State $s11 = new State ( "is9ElTOGXOmf8PMYtldD-Timer" );
                 insert ( $s11 );
                 // send the logging message "flow has finished"
                 String triggers[ ] = {"gGOruRmH9msGaqWfj3ma", "WTqM2Jz7jmyX8SuTEl5k"};
                 String actions[ ] = {"HETXVhFWgkNSJsOfNpeh"};
                 printStatus( "userlwtvmayb", "is9ElTOGXOmf8PMYtldD", "finished", triggers,
actions);
        end
        // convert the incoming "I came into this location" into the state "I'm in this location
        rule "is9ElTOGXOmf8PMYtldD-dd414528c1439efba84d6def881a280c-
gGOruRmH9msGaqWfj3ma RulesPayload2State"
```

APPENDIX A-continued

```
            no-loop true
        when
            $p4 : RulesPayload( seedId == "dd414528c1439efba84d6def881a280c",
seedInstanceId == "gGOruRmH9msGaqWfj3ma", getAttribute("eventType") ==
"location_enter" )
            not(
                State( state == "is9ElTOGXOmf8PMYtldD-
sdd414528c1439efba84d6def881a280c_gGOruRmH9msGaqWfj3ma" )   )
        then
            State $s6 = new State ( "is9ElTOGXOmf8PMYtldD-
sdd414528c1439efba84d6def881a280c_gGOruRmH9msGaqWfj3ma",
"dd414528c1439efba84d6def881a280c", "gGOruRmH9msGaqWfj3ma" );
            $s6.setAllAttributes ( $p4.getAllAttributes( ) );
            $s6.setAllVarIncs ( $p4.getAllVarIncs( ) );
            insert ( $s6);
            delete ( $p4);
        end
        // this can be used to change the "Im in this location" to "Im away from this location"
        rule "is9ElTOGXOmf8PMYtldD-dd414528c1439efba84d6def881a280c-
gGOruRmH9msGaqWfj3ma RulesPayload Modify State"
            no-loop true
        when
            $p5 : RulesPayload( seedId == "dd414528c1439efba84d6def881a280c",
seedInstanceId == "gGOruRmH9msGaqWfj3ma" )
            $s7: State( state == "is9ElTOGXOmf8PMYtldD-
sdd414528c1439efba84d6def881a280c_gGOruRmH9msGaqWfj3ma", Ts != $p5.getTs( ) )
        then
            modify ( $s7 ) {
                setTs( $p5.getTs( ) ),
                setAttribute( "eventType", $p5.getAttribute( "eventType"))
            }
            delete ( $p5 );
        end
        // At the end of the flow, remove all the intermediate state guards, triggering messages
and the flow timeout trigger
        rule "is9ElTOGXOmf8PMYtldD-- tidy-up"
            no-loop true
            salience -20
        when
            $s12 : State( state == "is9ElTOGXOmf8PMYtldD-UFlnayixwWAnbS5pLssR" )
        then
            deleteIfExists ( drools, new State ( "is9ElTOGXOmf8PMYtldD-
0gwu8gzX5IB0qpaJECvj" ) );
            deleteIfExists ( drools, $s12);
            deleteIfExists ( drools, new State ( "is9ElTOGXOmf8PMYtldD-Timer" ) );
            deleteIfExists ( drools, new RulesPayload( "dd414528c1439efba84d6def881a280c",
"gGOruRmH9msGaqWfj3ma" ) );
            deleteIfExists ( drools, new RulesPayload( "11a8be622b516402a1dc933ed0e44805",
"6RN3RPOnyHwZKnc64QiT" ) );
            deleteIfExists ( drools, new RulesPayload( "cc4c84e2c7430f7e6b1b78643da52753",
"HETXVhFWgkNSJs0fNpeh" ) );
            deleteIfExists ( drools, new RulesPayload( "d3e6ddb2548bcd6a9ef26334655bc8b5",
"WTqM2Jz7jmyX8SuTEl5k" ) );
            deleteIfExists ( drools, new RulesPayload( "57e02a90f6796e40a664f87e150e9f90",
"VHnimLWdn9RyfEkEIGZK" ) );
            String triggers[ ] = { };
            String actions[ ] = { };
            printStatus( "userlwtvmayb", "is9ElTOGXOmf8PMYtldD", "tidiedUp", triggers,
actions );
        end
        // Reset the flow after <60s> if the flow hasn't finished.
        // ie the timeout trigger is present after 60s, so remove the intermediate state guards
        rule "is9ElTOGXOmf8PMYtldD-- Timeout Timer"
            timer ( int: 60s )
        when
            $s13 : State( state == "is9ElTOGXOmf8PMYtldD-Timer" )
        then
            deleteIfExists ( drools, new State ( "is9ElTOGXOmf8PMYtldD-
0gwu8gzX5IB0qpaJECvj" ) );
            deleteIfExists ( drools, new State ( "is9ElTOGXOmf8PMYtldD-
UFlnayixwWAnbS5pLssR" ) );
            delete ( $s13 );
            String triggers[ ] = { };
            String actions[ ] = { };
            printStatus( "userlwtvmayb", "is9ElTOGXOmf8PMYtldD", "flowTimedOut", triggers,
actions );
        end
```

What is claimed is:

1. A method, comprising:
receiving, from a first computing device, information for controlling an Internet of Things (IoT) element;
receiving, from a second computing device, a request for one or more actions to be performed by the IoT element;
generating, based on the information and the request, a plurality of rules for controlling the IoT element;
receiving, from the IoT element, data associated with a state of the IoT element; and
sending, to the IoT element based on a determination that the data satisfies a condition associated with a rule of the plurality of rules, a command to cause performance of an action, of the one or more actions, that is associated with the condition.

2. The method of claim 1, wherein each rule of the plurality of rules defines a condition and an action to perform based on the condition being satisfied.

3. The method of claim 1, further comprising:
sending, to the second computing device, a subset of the information to enable display of graphical user interface elements associated with generating the plurality of rules.

4. The method of claim 1, wherein the information indicates at least one of a property, capability, or function associated with the IoT element usable for controlling the IoT element.

5. The method of claim 1, further comprising:
translating, based on the information, the command into a unified command usable by a plurality of IoT elements.

6. The method of claim 1, wherein the command was translated, based on the information, into a unified command.

7. The method of claim 1, further comprising:
sending, to a second IoT element, based on a determination that the data satisfies a second condition associated with a second rule of the plurality of rules, a second command to cause performance of a second action, of the one or more actions, that is associated with the second condition.

8. The method of claim 1, wherein the IoT element comprises at least one of:
a network connected device configured to receive data and perform the one or more actions, or
a network service, wherein the network service comprises at least one of a social media service or device manufacturer service.

9. A device comprising:
one or more processors; and
memory storing instructions that, when executed by the one or more processors, cause the device to:
receive, from a first computing device, information for controlling an Internet of Things (IoT) element;
receive, from a second computing device, a request for one or more actions to be performed by the IoT element;
generate, based on the information and the request, a plurality of rules for controlling the IoT element;
receive, from the IoT element, data associated with a state of the IoT element; and
send, to the IoT element based on a determination that the data satisfies a condition associated with a rule of the plurality of rules, a command to cause performance of an action, of the one or more actions, that is associated with the condition.

10. The device of claim 9, wherein each rule defines a condition and an action to perform based on the condition being satisfied.

11. The device of claim 9, wherein the information indicates at least one of a property, capability, or function associated with the IoT element usable for controlling the IoT element.

12. The device of claim 9, wherein the instructions, when executed by the one or more processors, further cause the device to:
translate, based on the information, the command into a unified command usable by a plurality of IoT elements.

13. The device of claim 9, wherein the command was translated, based on the information, into a unified command.

14. The device of claim 9, wherein the instructions, when executed by the one or more processors, further cause the device to:
send, to a second IoT element based on a determination that the data satisfies a second condition associated with a second rule of the plurality of rules, a second command to cause performance of a second action, of the one or more actions, that is associated with the second condition.

15. The device of claim 9, wherein the IoT element comprises at least one of:
a network connected device configured to receive data and perform the one or more actions, or
a network service, wherein the network service comprises at least one of a social media service or device manufacturer service.

16. A non-transitory computer-readable storage medium storing computer-readable instructions that, when executed by a processor, cause:
receiving, from a first computing device, information for controlling an Internet of Things (IoT) element;
receiving, from a second computing device, a request for one or more actions to be performed by the IoT element;
generating, based on the information and the request, a plurality of rules for controlling the IoT element;
receiving, from the IoT element, data associated with a state of the IoT element; and
sending, to the IoT element based on a determination that the data satisfies a condition associated with a rule of the plurality of rules, a command to cause performance of an action, of the one or more actions, that is associated with the condition.

17. The non-transitory computer-readable storage medium of claim 16, wherein each rule of the plurality of rules defines a condition and an action to perform based on the condition being satisfied.

18. The non-transitory computer-readable storage medium of claim 16, wherein the information indicates at least one of a property, capability, or function associated with the IoT element usable for controlling the IoT element.

19. The non-transitory computer-readable storage medium of claim 16, further storing computer-readable instructions that, when executed by the processor cause:
translating, based on the information, the command into a unified command usable by a plurality of IoT elements.

20. The non-transitory computer-readable storage medium of claim 16, wherein the command was translated, based on the information, into a unified command.

21. The non-transitory computer-readable storage medium of claim 16, further storing computer-readable instructions that, when executed by the processor cause:

sending, to a second IoT element based on a determination that the data satisfies a second condition associated with a second rule of the plurality of rules, a second command to cause performance of a second action, of the one or more actions, that is associated with the second condition.

\* \* \* \* \*